(12) United States Patent
Leeke et al.

(10) Patent No.: US 6,672,832 B2
(45) Date of Patent: Jan. 6, 2004

(54) STEP-DOWN TURBINE PLATFORM

(75) Inventors: Leslie Eugene Leeke, Burlington, KY (US); Sean Robert Keith, Fairfield, OH (US); Lawrence Paul Timko, Fairfield, OH (US)

(73) Assignee: General Electric Company, Schenectady, NY (US)

( * ) Notice: Subject to any disclaimer, the term of this patent is extended or adjusted under 35 U.S.C. 154(b) by 158 days.

(21) Appl. No.: 10/040,660

(22) Filed: Jan. 7, 2002

(65) Prior Publication Data
US 2003/0129055 A1 Jul. 10, 2003

(51) Int. Cl.$^7$ .................................. F01D 5/30
(52) U.S. Cl. ................. 415/191; 415/914; 416/193 A
(58) Field of Search ............... 416/193 A, 219 R, 416/220 R, 248; 415/189, 191, 208.2, 209.4, 210.1, 914

(56) References Cited

U.S. PATENT DOCUMENTS

| | | | |
|---|---|---|---|
| 3,577,735 A | * 5/1971 | Schmidt | 415/191 |
| 4,135,857 A | 1/1979 | Pannone et al. | |
| 4,583,914 A | * 4/1986 | Craig et al. | 416/219 R |
| 4,741,667 A | * 5/1988 | Price et al. | 415/191 |
| 5,020,970 A | 6/1991 | Dussourd et al. | |
| 5,993,160 A | * 11/1999 | Bouchard et al. | 416/193 A |
| 6,077,035 A | * 6/2000 | Walters et al. | 416/193 A |
| 6,158,961 A | * 12/2000 | Kehl et al. | 416/193 A |
| 6,261,053 B1 | 7/2001 | Anderson et al. | |
| 6,276,897 B1 | * 8/2001 | Tarada | 416/193 A |

FOREIGN PATENT DOCUMENTS

| | | | | |
|---|---|---|---|---|
| EP | 0913556 | | 5/1999 | |
| GB | 868100 A | * | 5/1961 | 415/191 |
| GB | 2042675 A | * | 9/1980 | 416/193 A |
| JP | 52-67404 A | * | 6/1977 | 416/193 A |
| JP | 58-162702 | | 9/1993 | |

* cited by examiner

Primary Examiner—Christopher Verdier
(74) Attorney, Agent, or Firm—William S. Andes; Francis L. Conte

(57) ABSTRACT

A turbine includes a row of blades each having an integral airfoil, platform, and dovetail. Each platform has opposite first and second side edges corresponding with the opposite pressure and suction sides of the airfoil. The platform first side edge is radially higher than the platform second side edge continuously between opposite forward and aft edges of the platform. In this way, adjacent platforms define a down step therebetween for preventing obstruction of combustion gases flowable downstream thereover.

18 Claims, 3 Drawing Sheets

STEP-DOWN TURBINE PLATFORM

BACKGROUND OF THE INVENTION

The present invention relates generally to gas turbine engines, and, more specifically, to turbines therein.

In a gas turbine engine air is pressurized in a compressor and mixed with fuel in a combustor for generating hot combustion gases that flow downstream through a high pressure turbine nozzle which directs the flow into a row of high pressure turbine rotor blades. The blades extract energy from the gases for powering the compressor, and a low pressure turbine is disposed downstream therefrom for extracting additional energy which typically powers a fan for producing propulsion thrust to power an aircraft in flight.

The nozzle includes stator vanes which like the turbine blades have an airfoil or crescent profile with substantial curvature or camber between leading and trailing edges thereof. The vane and blade airfoils have a generally concave pressure side and an opposite generally convex suction side along which the combustion gases flow during operation.

The respective suction sides of the vanes and blades are circumferentially spaced from the pressure sides of adjacent vanes and blades to define corresponding flow channels therebetween through which the combustion gases flow. The combustion gases enter the turbine nozzle in a generally axial downstream direction and are redirected at the trailing edges of the vanes at an oblique angle toward the leading edges of the rotating turbine blades.

Accordingly, the individual streamlines of the combustion gases flow generally parallel to each other between the nozzle vanes and between the turbine blades, but vary in curvature to correspond with the different velocities thereof as effected by the suction and pressure sides of the adjacent vanes and blades.

The blade platforms define the radially inner boundary which bounds the combustion gases as they flow between the turbine blades, and those platforms are aerodynamically smooth for maximizing efficiency and performance of the turbine during operation. However, the blades are individually mounted in the perimeter of a corresponding rotor disk using corresponding integral blade dovetails. And, each blade includes an individual platform integral with the airfoil and dovetail thereof, which platforms must circumferentially adjoin each other with a minimum circumferential clearance or gap therebetween.

Since the blade platforms are subject to common manufacturing tolerances which randomly vary their final dimensions, and since the platforms are also subject to stackup tolerances when mounted in their corresponding dovetail slots in the disk perimeter, the adjacent side edges of the platforms which define the axially extending gap therebetween are subject to random differences in radial elevation or height.

Should those platform side edges create an upstream facing step, the downstream flowing combustion gases will impinge on the up-step resulting in loss of aerodynamic efficiency as well as local heating of the projecting step leading to early oxidation and locally high thermal stress which may reduce the useful life of the turbine blade.

Preferably, the platform side edges should be flush or have a slight downstream facing step over which the combustion gases may flow without obstruction. However, since the combustion gas streamlines are necessarily redirected from the nozzle vanes between the turbine blades, those streamlines will normally traverse the platform gaps in opposite circumferential directions at the inlet and outlet ends of the corresponding flow channels.

This adds to the complexity of the platform design which may be intentionally warped to create the down step in one circumferential direction at the inlets to the turbine blades, and another down step in an opposite circumferential direction at the outlets of the turbine blades.

In order to create these oppositely facing down steps, the suction-side edge of one platform must be radially higher than the pressure-side edge of the adjacent platform at the forward ends thereof, with the aft ends thereof being radially lower for the suction-side edge compared with the pressure-side edge of the adjacent platforms. In this way, the steps between adjacent platforms change magnitude and direction between the forward and aft ends of the platforms for ensuring down steps only relative to the local direction of the combustion gas streamlines.

However, since the inter-platform steps change direction in this configuration, the steps gradually change in magnitude between the forward and aft edges of the platform and transition through a no-step flush point of the platforms in the axial middle thereof. Since the local direction of the combustion gas streamlines can change over the different operating points of the engine as well as over the life of the engine, the platform steps at both ends of the transition point may still create undesirable up steps instead of the intended down steps. An up step between the platforms locally obstructs the smooth flow of the combustion gases, and is locally heated thereby with an increased heat transfer coefficient, and is therefore subject to increased oxidation and locally high thermal stress which may decrease the useful life of the turbine blades.

Accordingly, it is desired to provide an improved turbine blade with a step-down platform for substantially all operating conditions of the gas turbine engine.

BRIEF SUMMARY OF THE INVENTION

A turbine includes a row of blades each having an integral airfoil, platform, and dovetail. Each platform has opposite first and second side edges corresponding with the opposite pressure and suction sides of the airfoil. The platform first side edge is radially higher than the platform second side edge continuously between opposite forward and aft edges of the platform. In this way, adjacent platforms define a down step therebetween for preventing obstruction of combustion gases flowable downstream thereover.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
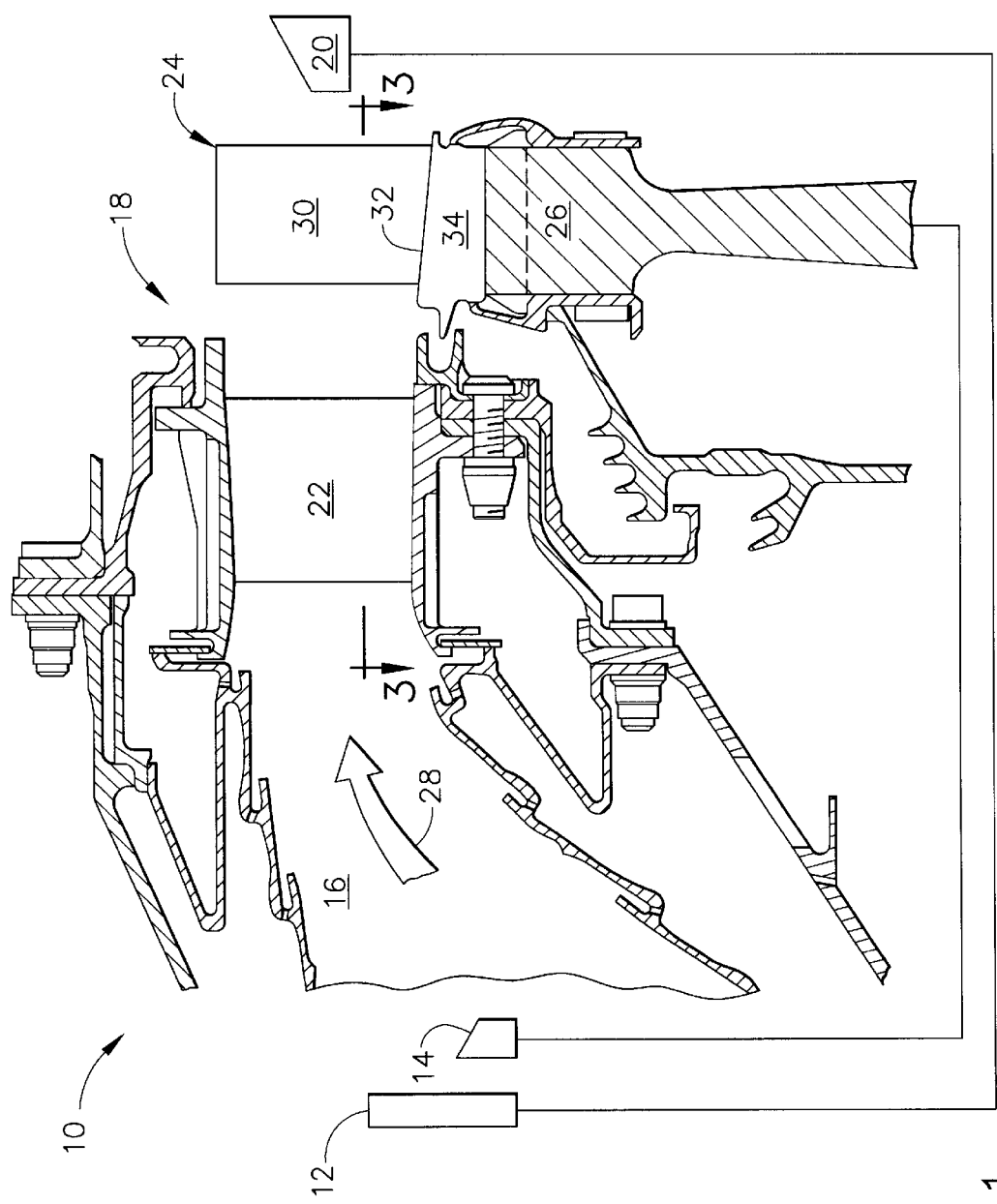
FIG. 1 is an axial sectional view of a portion of a turbofan aircraft gas turbine engine including a combustor discharging combustion gases through a high pressure turbine nozzle and turbine in accordance with an exemplary embodiment of the present invention.

Illustrated schematically in FIG. 1 is a gas turbine engine 10 in the exemplary form of a turbofan aircraft engine configured for powering an aircraft in flight. The engine includes in serial flow communication a fan 12, a multistage axial compressor 14, an annular combustor 16, a high pressure turbine 18, and low pressure turbine 20.

The high pressure turbine includes a turbine nozzle having a row of stator vanes 22 mounted in corresponding outer and inner bands segments. The nozzle vanes cooperate with a row of first stage turbine rotor blades 24 extending radially outwardly from a supporting rotor disk 26 joined by one shaft to the compressor 14. And, the low pressure turbine 20 is joined by a second shaft to the fan 12.

During operation, air is channeled through the fan and compressor and mixed with fuel in the combustor for generating hot combustion gases 28 which are discharged downstream through the high and low pressure turbine components. The high pressure turbine blades 24 extract energy from the combustion gases for powering the compressor, and additional energy is extracted by the blades of the low pressure turbine for powering the fan.

Figure 2:
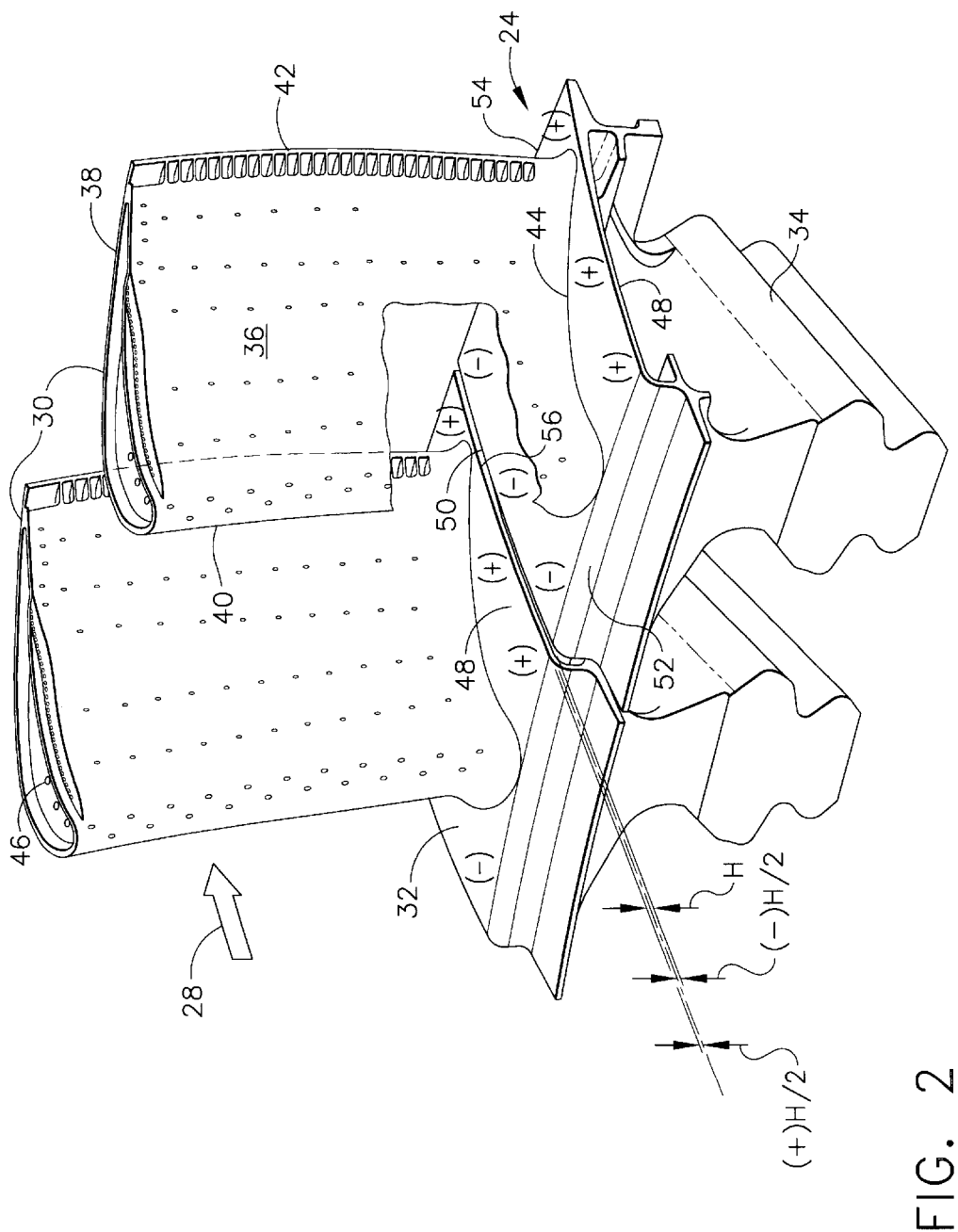
FIG. 2 is an isometric view of two adjacent turbine blades in accordance with the exemplary embodiment illustrated in FIG. 1.

Two adjacent high pressure turbine blades 24 are illustrated in more particularity in FIG. 2. Each blade includes an airfoil 30, a radially inner platform 32, and a dovetail 34 configured for mounting each blade in a corresponding dovetail slot in the perimeter of the rotor disk. And, each airfoil is typically hollow with internal cooling passages for channeling a portion of compressor air for cooling the airfoil during operation.

Each airfoil includes a generally concave first or pressure side 36 and a circumferentially opposite, generally convex second or suction side 38 extending axially or chordally between opposite leading and trailing edges 40, 42. The airfoil sides also extend radially in span between a radially inner root 44 adjoining the platform and a radially outer tip 46. The airfoil typically includes various film cooling holes and trailing edge holes through which cooling air is discharged from inside the airfoil for cooling thereof during operation.

Figure 3:
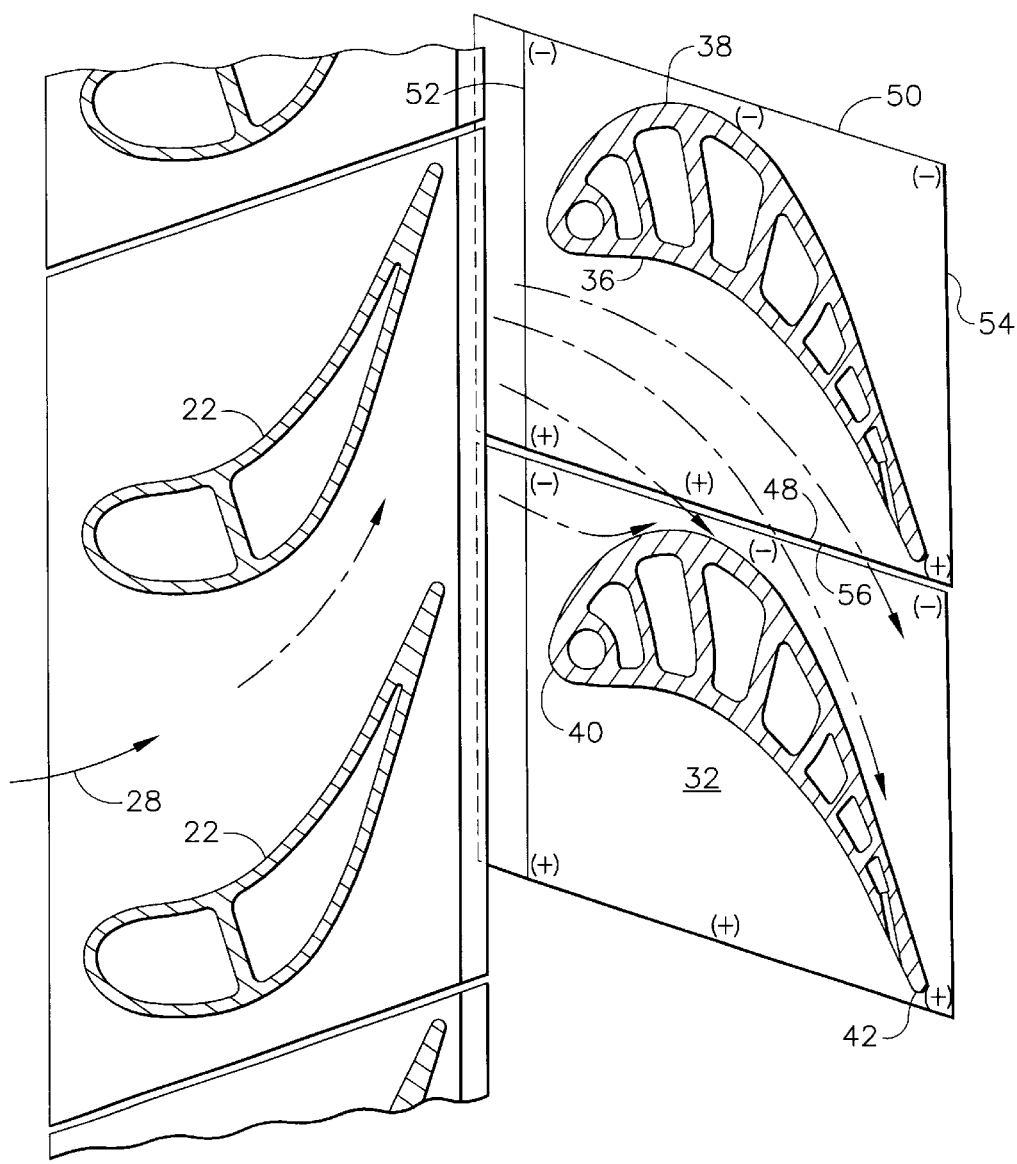
FIG. 3 is a radial sectional view through the vanes and blades of the turbine illustrated in FIG. 1 and taken along line 3—3.

As shown in FIGS. 2 and 3, each platform 32 includes an outer surface facing radially outwardly around the airfoil root for providing a radially inner boundary for the combustion gas flow. The platform includes a perimeter of circumferentially opposite first and second side edges 48, 50, and axially opposite forward and aft edges 52, 54.

The platform first side edge 48 is disposed along the airfoil pressure side, with the platform second side edge 50 being disposed along the airfoil suction side. The platform forward edge is disposed below and upstream of the airfoil leading edge, with the platform aft edge being disposed below and downstream of the airfoil trailing edge. And, the platform typically includes an angel wing extension below its forward edge for providing a suitable labyrinth seal with the inner band of the upstream turbine nozzle.

In accordance with the present invention, the platform first edge 48 is disposed radially higher (+) than the platform second edge 50 which is relatively radially lower (−), continuously between the platform forward and aft edges 52, 54 to define a radially inwardly dropping down step 56 between the corresponding first and second edges of adjacent platforms. In this way, as the combustion gases flow downstream through the flow channels between adjacent turbine blades, the gases drop off the step, with the down step preventing local obstruction of the combustion gases.

This is in contrast with a radially outwardly extending up step creating a local obstruction against which the combustion gases would impinge. The desired down step improves aerodynamic performance of the combustion gas flow, eliminates local obstruction thereof and reduces oxidation and thermal stress threat for increasing the useful life of the turbine blade.

As shown in FIG. 3, the first and second edges 48, 50 of the platform are preferably oblique to the forward and aft edges 52, 54 in a generally parallelogram configuration. The first side edge 48 is spaced from the airfoil leading edge 40 at its junction with the root greater than the spacing between the first edge and the airfoil trailing edge 42. In this way, the airfoil trailing edge is disposed closely adjacent to the platform first edge, while the airfoil leading edge 40 is spaced considerably from the platform first edge for permitting the combustion gases to flow downstream obliquely over the platform first edge and over the gap with the second edge of the adjacent platform.

In this way, the down step 56 of one blade platform faces the airfoil suction side 38 on the adjacent blade platform continuously between the leading and trailing edges of the airfoils.

In the preferred embodiment illustrated in FIG. 3, the platform first and second edges 48, 50 and the down step 56 are axially or chordally straight, and the airfoil is disposed diagonally in radial section atop the corresponding platforms. This configuration ensures that the combustion gases are channeled between the adjacent turbine blades downstream over the platform first edge 48, over the down step 56, and onto the second edge 50 of the adjacent platform. The down step 56 extends from the platform forward edge 52 where it begins to the platform aft edge 54 where it terminates.

As shown in FIG. 2, the down step 56 is preferably substantially uniform in radial height H between the forward and aft edges 52, 54 of the platform. This uniform height down step avoids the problem of step height variation, and is made sufficiently large to accommodate manufacturing tolerances, stackup thereof, and variations in thermal growth during operation of the turbine.

But for the radial position of the two side edges 48, 50 of the platforms, the platforms have a substantially uniform convex outer surface matching the required annular configuration between the forward and aft edges thereof to meet the required aerodynamic performance of the combustion gas flow between the turbine blades. Accordingly, each platform first edge 48 is preferably radially higher (+) than the remainder of the platform circumferentially inboard therefrom. And, each platform second edge 50 is preferably radially lower (−) than the remainder of the platform circumferentially inboard therefrom to collectively effect the down step between adjacent first and second edges of adjoining platforms.

As shown in FIG. 2, the platform first edge 48 may be relatively higher than the inboard main portion of the platform by half, H/2, the desired height H of the down step 56, and the platform second edge 50 may be radially lower in height from the inboard main portion of the platform by again half, H/2, the intended height H of the down step. In this way, when the two edges 48, 50 of adjacent platforms are mounted in position, the collective difference in radial height thereof is the desired step height H. For example, the desired down step height H may be about 20 rails (0.51 mm), effected by half that amount both relatively higher for the platform first edge 48 and relatively lower for the platform second edge 50.

Each platform preferably varies in radial elevation gradually from the main portion thereof around the perimeter of the airfoil root to the opposite first and second edges 48, 50. This smooth transition ensures an aerodynamically smooth outer surface of the platform blending to the down step 56 at the adjoining platforms, and eliminates the possibility or likelihood of an up facing step meeting the downstream flowing combustion gases.

To ensure the effective operation of the down step 56, the turbine nozzle vanes 22 illustrated in FIG. 3 are configured for directing the combustion gases 28 downstream between the turbine blades in streamlines directed obliquely across the platform first side edges 48 for step-down over the adjacent platform second side edges 50 from the forward to aft edges of each platform along the entire extent of the circumferential gap therebetween.

Modern three-dimensional computational analysis may be used for configuring the 3-D aerodynamic profile of each of the nozzle vanes 22 and the inter-vane flow channels therebetween for discharging the combustion gases for redirection between the flow channels of the turbine blades with the desired streamlines. The combustion gas streamlines will enter the inter-blade flow channels in the general axial downstream direction initially generally parallel with the obliquely disposed platform edges. The streamlines then follow the diagonal contour of the blades and flow channels therebetween for flowing downstream over the down step 56.

In this way, the combustion gas streamlines are constrained by the aerodynamic profiles of the nozzle vanes and turbine blades to flow between the turbine blades in the same oblique direction downstream over the platform first edges 48 in step-down flow to the adjoining platform second edges 50. In this configuration, the combustion gas streamlines will traverse the inter-platform gaps only once in their downstream travel between the blades, and not in the two opposite traverses typically found in conventional high pressure turbines.

Accordingly, the high pressure turbine including the nozzle vanes and turbine blades may be designed with modern 3-D computational techniques for maximizing the aerodynamic performance and efficiency of the turbine, and at the same time creating combustion gas streamlines traversing only once the inter-platform gaps to ensure the effective operation of the down steps provided therebetween. The possibility of an up step is thusly eliminated for ensuring maximum performance of the high pressure turbine and long useful life of the turbine blades.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine comprising:
   a row of turbine blades extending radially outwardly from a supporting rotor disk;
   each turbine blade including an airfoil, a platform, and dovetail in a unitary assembly;
   each airfoil including opposite pressure and suction sides extending chordally between leading and trailing edges, and radially between a root adjoining said platform and a tip;
   each platform including an outer surface facing radially outwardly around said airfoil root within a perimeter of opposite first and second side edges, and opposite forward and aft edges; and
   said platform first side edge being disposed along said airfoil pressure side, said platform second side edge being disposed along said airfoil suction side, said platform first edge being radially higher than said platform inboard therefrom, said platform second edge being radially lower than said platform inboard therefrom, and said first side edge of each platform being radially higher than said second side edge of an adjacent platform continuously between said platform forward and aft edges to define a down step therebetween for preventing obstruction of combustion gases flowable thereover.

2. A turbine according to claim 1 wherein said platform first and second edges are oblique to said forward and aft edges, with said first edge being spaced from said airfoil leading edge greater than from said airfoil trailing edge, and said down step faces said airfoil suction side of an adjacent platform between said leading and trailing edges.

3. A turbine according to claim 2 wherein said platform first and second edges and down step are straight.

4. A turbine according to claim 3 wherein said airfoil is disposed diagonally in section atop said platform for channeling said combustion gases downstream over said down step from said platform forward edge to said aft edge.

5. A turbine according to claim 4 wherein said down step is substantially uniform in height between said platform forward and aft edges.

6. A turbine according to claim 4 wherein said platform first edge is radially higher than said platform inboard therefrom by about half said down step, and said platform second edge is radially lower than said platform inboard therefrom by about half said down step.

7. A turbine according to claim 4 further comprising a turbine nozzle disposed upstream from said row of turbine blades, and including a row of nozzle vanes configured for directing said combustion gases downstream between said turbine blades in streamlines directed obliquely across said platform first side edges for step-down over adjacent platform second side edges from said forward to aft edges.

8. A turbine comprising:
   a row of turbine blades extending radially outwardly from a supporting rotor disk;
   each turbine blade including an airfoil, a platform, and dovetail in a unitary assembly;
   each airfoil including opposite pressure and suction sides extending chordally between leading and trailing edges, and radially between a root adjoining said platform and a tip;
   each platform including an outer surface facing radially outwardly around said airfoil root within a perimeter of opposite first and second side edges, and opposite forward and aft edges;
   said platform first side edge being disposed along said airfoil pressure side, said platform second side edge being disposed along said airfoil suction side, said platform first edge being radially higher than said platform inboard therefrom, said platform second edge being radially lower than said platform inboard therefrom, and said first side edge of each platform being radially higher than said second side edge of an adjacent platform continuously between said platform forward and aft edges to define a down step therebetween for preventing obstruction of combustion gases flowable thereover; and a turbine nozzle disposed upstream from said row of turbine blades, and including a row of nozzle vanes configured for directing said combustion gases downstream between said turbine blades in streamlines directed obliquely across said platform first side edges for step-down over adjacent platform second side edges from said forward to aft edges.

9. A turbine according to claim 8 wherein said airfoil is disposed diagonally in section atop said platform for channeling said combustion gases downstream over said down step from said platform forward edge to said aft edge.

10. A turbine according to claim 9 wherein said platform first and second edges and down step are straight.

11. A turbine according to claim 10 wherein said platform first and second edges are oblique to said forward and aft edges, with said first edge being spaced from said airfoil leading edge greater than from said airfoil trailing edge, and said down step faces said airfoil suction side of an adjacent platform between said leading and trailing edges.

12. A turbine according to claim 11 wherein said platform first edge is radially higher than said platform inboard therefrom by about half said down step, and said platform second edge is radially lower than said platform inboard therefrom by about half said down step.

13. A turbine according to claim 12 wherein said down step is substantially uniform in height between said platform forward and aft edges.

14. A turbine blade comprising:

an airfoil, platform, and dovetail in a unitary assembly;

said airfoil including opposite pressure and suction sides extending chordally between leading and trailing edges, and radially between a root adjoining said platform, and a tip;

said platform including an outer surface facing radially outwardly around said airfoil root within a perimeter of opposite first and second side edges, and opposite forward and aft edges; and said platform first side edge being disposed along said airfoil pressure side, said platform second side edge being disposed along said airfoil suction side, said platform first edge being radially higher than said platform inboard therefrom, said platform second edge being radially lower said platform inboard therefrom, and said first side edge being radially higher than said second side edge continuously between said platform forward and aft edges to define a down step with an adjacent one of said turbine blades when mounted in a rotor disk.

15. A blade according to claim 14 wherein said platform first and second edges are oblique to said forward and aft edges, with said first edge being spaced from said airfoil leading edge greater than from said airfoil trailing edge.

16. A blade according to claim 15 wherein said platform first and second edges are straight.

17. A blade according to claim 16 wherein said airfoil is disposed diagonally in section atop said platform for channeling combustion gases downstream over said platform first side edge from said forward edge to said aft edge.

18. A blade according to claim 17 wherein said platform first edge is radially higher than said platform inboard therefrom by about half said down step, and said platform second edge is radially lower said platform inboard therefrom by about half said down step.

* * * * *

UNITED STATES PATENT AND TRADEMARK OFFICE
CERTIFICATE OF CORRECTION

PATENT NO.    : 6,672,832 B2
DATED         : January 6, 2004
INVENTOR(S)   : L.E. Leeke et al.

It is certified that error appears in the above-identified patent and that said Letters Patent is hereby corrected as shown below:

<u>Column 4,</u>
Line 64, delete "rails" and substitute therefor -- mils --.

Signed and Sealed this

Eighteenth Day of May, 2004

JON W. DUDAS
*Acting Director of the United States Patent and Trademark Office*